United States Patent [19]

Eckstein et al.

[11] Patent Number: 4,560,310
[45] Date of Patent: Dec. 24, 1985

[54] TOOL HOLDER FOR BORING, MILLING AND THE LIKE MACHINE TOOLS

[75] Inventors: Rolf Eckstein, Rödental-Fischbach; Ralf Dechert, Grub am Forst, both of Fed. Rep. of Germany

[73] Assignee: Werkzeugmaschinenfabrik Adolf Waldrich Coburg GmbH & Co., Coburg, Fed. Rep. of Germany

[21] Appl. No.: 580,903

[22] Filed: Feb. 16, 1984

[30] Foreign Application Priority Data

Feb. 26, 1983 [DE] Fed. Rep. of Germany ....... 3306823

[51] Int. Cl.$^4$ .............................................. B23C 9/00
[52] U.S. Cl. .................................... 409/233; 279/1 E
[58] Field of Search .......................... 408/239, 239 A; 279/1 A, 1 E, 57; 409/231–234

[56] References Cited

U.S. PATENT DOCUMENTS 3,680,435  8/1972  DePlante ............................ 409/233

FOREIGN PATENT DOCUMENTS 1282418  11/1968  Fed. Rep. of Germany ........ 279/57
145606  12/1980  German Democratic Rep. .................................... 409/233

Primary Examiner—Eugene F. Desmond
Attorney, Agent, or Firm—Flynn, Thiel, Boutell & Tanis

[57] ABSTRACT

A tool holder for boring, milling and the like machine tools has a conical shaft with a support member arranged coaxially on said conical shaft. The conical shaft fits into a conical first receiving bore of the machine tool spindle. The support member has a second conical receiving bore for the conical shaft of a tool. The second conical receiving bore is coaxial with the tool holder conical shaft and is smaller than the first receiving bore of the spindle. The tool holder conical shaft has a coaxial bore, in which is axially movable a collet carrier with a collet. The ends of the collet are constructed as claws and engage an annular groove at the free end of the tool conical shaft. Several axially acting cup-spring packages are arranged in the support member concentrically with respect to the second conical receiving bore. The cup-spring packages act onto the collet carrier through several radially extending support arms for clamping the tool conical shaft in the tool holder. To release the collet and to eject the tool conical shaft, at least one hydraulically loadable piston, which acts onto the collet carrier opposite to the spring pressure, is provided in the bore of the tool holder conical shaft.

8 Claims, 1 Drawing Figure

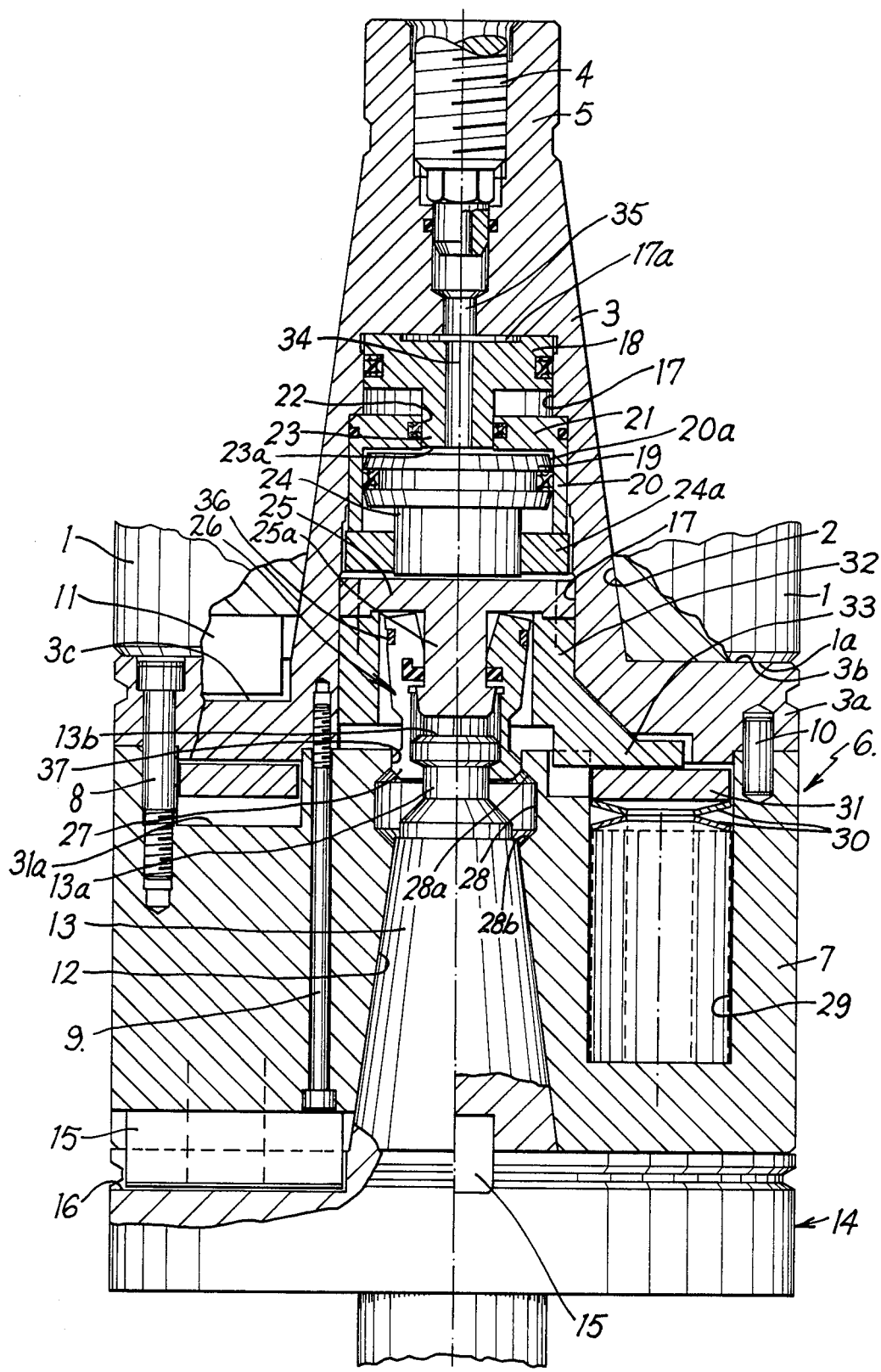

TOOL HOLDER FOR BORING, MILLING AND THE LIKE MACHINE TOOLS

FIELD OF THE INVENTION

The invention relates to a tool holder for boring, milling and the like machine tools, comprising a conical shaft which fits in a conical first receiving bore of the machine tool spindle, a support member arranged coaxially on the conical shaft and having a second conical receiving bore for the conical shaft of a tool, which second conical receiving bore is coaxial with the tool holder conical shaft and is smaller than the spindle-receiving bore, and a clamping mechanism for clamping the tool conical shaft in the second conical receiving bore.

BACKGROUND OF THE INVENTION

In larger boring, milling and the like machine tools, the spindle has for the transmission of the drive forces onto the tool a conical receiving bore, which is as large as possible, for receiving a tool with a conical shaft, which is as large as possible, for example an ISO 60 7/24 shank. However, on such modern large machine tools also precision work (like boring, milling and thread-cutting) with smaller tools must be carried out. It is thus necessary to provide a tool holder which can be inserted into the conical receiving bore of the spindle, which tool holder itself also has a conical receiving bore but of smaller dimensions, for receiving a smaller conical shaft, for example an ISO 50 7/24 shank of a tool. Such tool holders, which permit the use of tools with smaller conical shafts than the spindle-receiving bore, are also known as reducers, adapters or intermediate pieces. In a known tool holder of the above-mentioned type (shown in a brochure of the Firm Forkardt entitled "Schnellwechsel-Werkzeughalter System Erickson" ("Quickchange tool holder System Erickson") and published in 1978), the support member has on its outer periphery a thread, onto which is screwed a retaining nut. Said nut is provided with two inwardly projecting fingers, which can move through the keyways of a flange provided on the tool following the conical shaft. Upon rotation of the nut, the fingers rest on the outside of the flange and pull the tool conical shaft into the receiving bore of the support member. The nut thus serves as a type of clamping mechanism for clamping the tool conical shaft in the receiving bore of the support member. Aside from the fact that with the help of such a nut only relatively small clamping forces can be applied, which are not sufficient for the large machine tools, this known tool holder is also not suited for an automatic tool exchange.

The basic purpose of the invention is to produce a tool holder for boring milling and the like machine tools of the above-mentioned type, which, with minimum expense and high reliability and in a small (in particular small axial) space, permits an automatic exchange of tools with a high clamping force and also a high ejecting force, such tool holder itself being automatically exchangeable in a simple manner on the machine tool spindle, if desired.

This is attained according to the invention by the tool holder conical shaft having a coaxial bore, in which is axially movable a collet carrier with a collet, the ends of which collet are constructed as claws and engage an annular groove at the free end of the tool conical shaft; by arranging in the support member, concentric with the second conical receiving bore, several axially acting cup-spring packages, which cup-spring packages act in a tool clamping sense through several radially extending support arms onto the collet carrier; and by providing in the bore of the tool holder conical shaft at least one hydraulically loadable piston, which acts opposite to the spring pressure on the collet carrier for releasing the collet and ejecting the tool cone.

With the help of the cup-spring packages, which are arranged concentric with the second conical receiving bore and which act onto the collet carrier, a high spring pressure is achieved, which reliably pulls the conical shaft of the tool into the conical receiving bore. By arranging several cup-spring packages in the support member around the second receiving bore, a relatively short axial structural length of the tool holder and a high clamping force are achieved. For the purpose of releasing the collet and for ejecting the tool, a hydraulically loadable piston is provided, which acts against the spring pressure of the cup-spring packages. By arranging this piston and the collet carrier in a bore of the tool holder conical shaft, the available space is well utilized, which also results in a structure of small dimensions in the axial direction. Since for releasing the collet and for ejecting the tool conical shaft only the feeding of a pressure medium to the tool holder is necessary, which can be done for example by a hollow draw rod in the machine tool spindle, and since for clamping the tool conical shaft the axially acting cup-spring packages serve after eliminating the pressure loading on the piston, the new tool holder is suited very well for automatic exchange of smaller tools. The new tool holder itself can also, in a simple manner by means of the draw rod in the machine tool spindle, be pulled into the conical receiving bore of the spindle or be ejected from the spindle and be exchanged for another tool or other mechanism, which if desired can also occur automatically.

In order to assure the desired high clamping forces, it is necessary to provide a correspondingly large number of cup springs in the support member. For releasing the collet, the piston must act against this high clamping force applied by the cup springs. Furthermore, for ejecting a tightly fitting tool conical shaft, the friction forces between said conical shaft and the conical receiving bore must also be overcome. In order to assure here a satisfactory release and ejection function, it is advantageous to permit two pistons which are oriented one after the other to act on the collet carrier.

Therefore, in a further advantageous development of the invention the tool holder conical shaft contains two pistons located axially one after the other. The first piston is supported movably in the bore itself and the second piston is supported movably in a cylinder inserted into the bore. The cylinder has a bottom through which is guided a piston rod of the first piston, which piston rod rests on the second piston. The second piston acts with its piston rod onto the collet carrier.

This orientation of the pistons one after the other permits producing, in the available, relatively small structural space within the tool conical shaft, the necessary ejecting force.

Further advantageous developments of the invention will be discussed in greater detail hereinafter in connection with one exemplary embodiment, which is illustrated in the drawing.

BRIEF DESCRIPTION OF THE DRAWING

The drawing is an axial cross-sectional view of the new tool holder, wherein the cutting plane for the right half of the axial cross section is 90° from the left half.

DETAILED DESCRIPTION

The spindle 1 of a boring, milling or the like machine tool is provided with a conical receiving bore 2, for example for receiving an ISO 60 7/24 shank. A draw rod 4 is provided in the spindle 1 in a conventional manner for clamping and releasing a conical shaft 3 which is inserted into the receiving bore 2. The draw rod 4 is preferably provided with a longitudinal bore 5 for supplying a hydraulic pressure medium.

A tool holder 6 can be inserted into the spindle 1, and comprises the conical shaft 3 and a support member 7 arranged coaxially thereon. The support member 7 is advantageously cylindrical in shape and is connected to a flange 3a integral with the conical shaft 3 by several screws 8, 9. For transmitting the torque from the flange 3a to the support member 7, several guide pins 10 are provided. The flange 3a has furthermore keyways 3c, in which are engaged keys 11 fixed on the spindle 1. The conical shaft 3 and the planar surface 3b of the flange 3a are adjusted to one another by grinding such that the planar surface 3b rests on the front surface 1a of the spindle 1.

The support member 7 has a second conical receiving bore 12, which is designated to receive a conical shaft 13 of a boring, milling or threading tool 14. The tool conical shaft 13 has smaller dimensions compared with the conical shaft 3 of the tool holder and is for example an ISO 50 elongated cone. Furthermore, keys 15 are secured on the support member, which keys engage in corresponding keyways 16 of the tool.

A coaxial, steplike offset, bore 17 is provided in the tool holder conical shaft 3. The uppermost portion of said bore 17 forms a cylinder chamber for a first piston 18. A second piston 19 is supported in a cylinder 20, which is inserted into the bore 17. The cylinder 20 has a bottom 21 with an opening 22. The piston rod 23 of the first piston 18 extends through said opening 22. The piston rod 23 rests with its lower end 23a on the piston 19, so that both pistons 18, 19 are connected one behind the other. In order that the top of the second piston 19 is loaded with pressure medium on as large as possible a surface area, the first piston 18 has a central throughbore 34 and its lower end 23a is provided with several open-ended radial grooves (not shown) radiating from bore 34 for passing pressure medium from supply bore 5 to the top surface of second piston 19. The second piston 19 has a piston rod 24 which extends slidably through an annular guide 24a fixed in said bore 17 and acts on the collet carrier 25.

Said collet carrier 25 has a center ejector pin 25a, on which is supported the collet 26 which comprises several collet levers. Each collet lever is provided with a claw 27 at its lower end. The claws 27 cooperate with an annular groove 13a in the free end of the conical shaft 13 and are controlled by an annular groove 28 in the support member 7, which groove 28 has truncated-cone-shaped flanks 28a and 28b.

The support member 7 has several, for example six, blind bores 29, which extend axially parallel and are arranged on a circle concentric to the receiving bore 12. Each of said blind bores 29 receives a cup-spring package 30 comprising several cup springs. The cup-spring packages 30 apply a compressive force directed upwardly toward the flange 3a.

An axially movable support ring 31 is provided movably in an upward facing annular groove 31a in the support member 7, which groove 31a circumferentially communicates with the upper ends of the blind bores 29 and on which ring 31 bear the cup-spring packages 30.

A thrust ring 32 is connected fixedly to the collet carrier 25 and has several, for example six, radially extending support arms 33 which rest on the support ring 31. The compressive forces of the cup-spring packages 30 are transmitted onto the collet carrier 25 through the support ring 31, the support arms 33 and the thrust ring 32.

To release and eject the tool conical shaft 13, pressure oil is supplied to the upper chamber 17a of the bore 17 through the draw rod 4 and a pressure-medium feed bore 35 which is provided in the conical shaft 3. Due to the center bore 34 in the first piston 18, it is possible for the pressure of the pressure oil to expand in the cylinder chamber 20a of the cylinder 20. The pistons 18 and 19, which are oriented one after the other, press the collet carrier 25 downwardly against the spring pressure of the cup-spring packages 30. The claws 27 thus move into the annular groove 28 and are moved radially outwardly under the action of an elastic ring 36 which surroundingly engages the collet arms 26. This releases the tool conical shaft 13 which can now exit downwardly out of the receiving bore 12. Should the tool conical shaft 13 be stuck in the receiving bore 12, further movement of the collet carrier 25 downwardly will abut its center ejector pin 25a on the free end 13b of the conical shaft 13 and will force same downwardly and thereby free same from the bore 12. The orientation of the pistons 18, 19 one after the other applies, despite the relatively small space available in the conical shaft 3, sufficient downwardly directed force not only to overcome the spring pressure of the cup-spring packages 30, but also friction forces between conical shaft 13 and receiving bore 12.

The tool 14, which has been released in this manner, can be moved down out of the receiving bore 12 by an automatic tool changer (not shown) and can be fed to a magazine (not shown). The tool changer can then place the conical shaft 13 of another tool into the receiving bore 12. The fluid pressure existing in the chambers 17a and 20a is then eliminated. The collet carrier 25 is thereupon pressed upwardly by the action of the cup-spring packages 30. As a result, the claws 27 will first engage on the conical flanks 28a and thereby be forced into the annular groove 13a of the tool. The opening 37 is held smaller in diameter than the annular groove 28 and thus prevents, during further upward movement of the collet carrier 25 and the collet 26, the claws 27 from escaping radially outwardly. Under the spring pressure of the cup-spring packages 30, the conical shaft 13 is now pulled completely into the receiving bore 12 and is thus held with a high initial retaining force in the receiving bore 12. Such retaining force is maintained even if the machine tool, on which the tool holder 6 is used, is deprived of its energy supply.

It is contemplated to effect the pressure-medium supply from the draw rod 4 to the conical shaft 3 through a commercially available plug coupling.

Alternately, pressure medium could be supplied by providing a plug coupling on the flange 3a to which, after stopping the spindle 1, a pressure-oil hose could connect. Such a plug coupling would be connected through pressure-medium channels (not shown) in the flange 3a and in the conical shaft 3 to the pressure chambers 17a or 20a to apply the pressure medium to such chambers.

The orientation of the pistons 18, 19 one after the other is of great importance for a satisfactory release and ejection of the tool conical shaft 13. The necessary ejecting forces can be many times higher than the pulling-in forces effected by the cup-spring packages. For example, a fresh cold tool has its conical shaft inserted into a hot tool carrier which was heated up by a just-completed machining operation, and then the conical shaft of the tool expands due to heat created during the following machining operation. Such creates high heat stresses which hold the tool conical shaft tightly in the receiving bore, as in a so-called shrink fit, in which a heated-up hub is shrunk onto a cold shaft. The pistons 18 and 19, which are oriented one after the other, thus must not only overcome the compressive forces of the cup-spring packages 30, but also the considerable adhesive forces caused by such heat stresses.

Although a particular embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A tool holder for boring, milling and the like machine tools, comprising a spindle, a conical shaft which fits into a first conical receiving bore in the spindle, a support member arranged coaxially on the conical shaft and having a second conical receiving bore for receiving the conical shaft of a tool, said second conical receiving bore being coaxial with the conical shaft, said second conical receiving bore being smaller than the spindle-receiving bore, a clamping mechanism for clamping of the tool conical shaft in the second conical receiving bore, the clamping mechanism comprising a coaxial hole in the tool holder conical shaft, a collet carrier with a collet axially movable in said coaxial hole, the ends of said collet being constructed as claws engageable with an annular groove at the free end of the tool conical shaft, the support member containing several axially acting cup-spring packages concentric with the second conical receiving bore, thrust means including several radially extending support arms actuable for causing clamping by the collet carrier to hold the tool conical shaft, at least one piston provided in the bore of the tool holder conical shaft and loadable by pressure medium for acting on the collet carrier in opposition to the spring pressure for releasing the collet and ejecting of the tool conical shaft.

2. A tool holder according to claim 1, including two said pistons arranged axially one after the other in the tool holder conical shaft, the first said piston being supported movably in the bore itself and the second said piston being movable in a cylinder sleeve with a bottom, said cylinder sleeve being inserted into the said bore of the tool holder conical shaft and guiding therethrough a piston rod of the first piston, said piston rod resting on the second piston, whereby the second piston acts with a piston rod onto the collet carrier.

3. A tool holder according to claim 2, including a center bore in the first piston and its piston rod.

4. A tool holder according to claim 1, including a center pressure-medium feed bore communicating with the bore in the tool holder conical shaft.

5. A tool holder according to claim 1, including a center ejector pin which carries the collet and is arranged on the collet carrier.

6. A tool holder according to claim 1, wherein the support member for receiving the cup-spring packages has several blind bores, which blind bores are arranged on a circle concentric with the receiving bore.

7. A tool holder according to claim 1, including an axially movable support ring between the cup-spring packages and the support arms.

8. A tool holder according to claim 1, wherein the support member is cylindrical and is screwed to a flange integral with the tool holder conical shaft.

* * * * *